(12) United States Patent
Miller (10) Patent No.: US 12,132,342 B2
(45) Date of Patent: Oct. 29, 2024

(54) CONTACT LENS CHARGING CIRCUIT

(71) Applicant: Tectus Corporation, Saratoga, CA (US)

(72) Inventor: Gregory David Miller, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 776 days.

(21) Appl. No.: 17/307,941

(22) Filed: May 4, 2021

(65) Prior Publication Data

US 2022/0357597 A1 Nov. 10, 2022

(51) Int. Cl.
| | |
|---|---|
| H02J 7/00 | (2006.01) |
| G02C 7/04 | (2006.01) |
| G02C 11/00 | (2006.01) |
| H02J 7/02 | (2016.01) |
| H02J 50/10 | (2016.01) |

(52) U.S. Cl.
CPC .......... *H02J 7/007188* (2020.01); *G02C 7/04* (2013.01); *H02J 7/00308* (2020.01); *H02J 50/10* (2016.02); *G02C 11/10* (2013.01); *H02J 7/02* (2013.01); *H02J 2207/20* (2020.01); *H02J 2310/23* (2020.01)

(58) Field of Classification Search
CPC .. H02J 7/00308; H02J 7/007188; H02J 50/10; G02C 7/04
USPC .......................................... 320/108; 307/104
See application file for complete search history.

(56) References Cited

U.S. PATENT DOCUMENTS

| | | | |
|---|---|---|---|
| 7,514,899 B2 | 4/2009 | Deng-Peng | |
| 8,755,161 B2 | 6/2014 | James | |
| 2010/0295506 A1* | 11/2010 | Ichikawa | B60L 50/16 |
| | | | 320/108 |
| 2016/0124248 A1* | 5/2016 | Humphreys | H02J 9/005 |
| | | | 351/158 |
| 2017/0063161 A1* | 3/2017 | Sugiyama | H02J 50/80 |
| 2018/0360326 A1* | 12/2018 | Lee | G06F 3/0346 |
| 2019/0283615 A1* | 9/2019 | Lee | B60L 53/12 |
| 2020/0260971 A1* | 8/2020 | Bushnell | G04G 17/08 |

OTHER PUBLICATIONS

Crowbar datasheet (Year: 2005): MC3423 data sheet, Mar. 2005, Semiconductor Components Industries, LLC, Rev. 5 (https://www.onsemi.com/pdf/datasheet/mc3423-d.pdf) pp. 2-3.*
Transistors vs relays (Year: 2018): Jeremy S Cook, "Relays vs. transistors: Choosing the best tool for the job", Aug. 14, 2018, Arrow.com, Transistors section pp. 4-5, (https://www.arrow.com/en/research-and-events/articles/relays-vs-transistors-choosing-the-best-tool-for-the-job).*

* cited by examiner

*Primary Examiner* — Drew A Dunn
*Assistant Examiner* — Kaylene A Isbel
(74) *Attorney, Agent, or Firm* — Lewis Roca Rothgerber Christie LLP (57) ABSTRACT

An electronic contact lens. The electronic contact lens includes an energy storage device and a charging circuit for charging the energy storage device. The electronic contact lens is configured to disable the charging circuit when the contact lens is worn.

1 Claim, 8 Drawing Sheets

CONTACT LENS CHARGING CIRCUIT

FIELD

One or more aspects of embodiments according to the present disclosure relate to electronic contact lenses, and more particularly to a charging circuit for such contact lenses.

BACKGROUND

Augmented reality is a rapidly growing market. Electronic contact lenses for providing augmented reality may offer a lightweight, unobtrusive, immersive experience. Such an electronic contact lens may include various electronic components, powered by one or more rechargeable batteries, which may be recharged from time to time.

Thus, there is a need for a charging circuit suitable for an electronic contact lens.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1A:
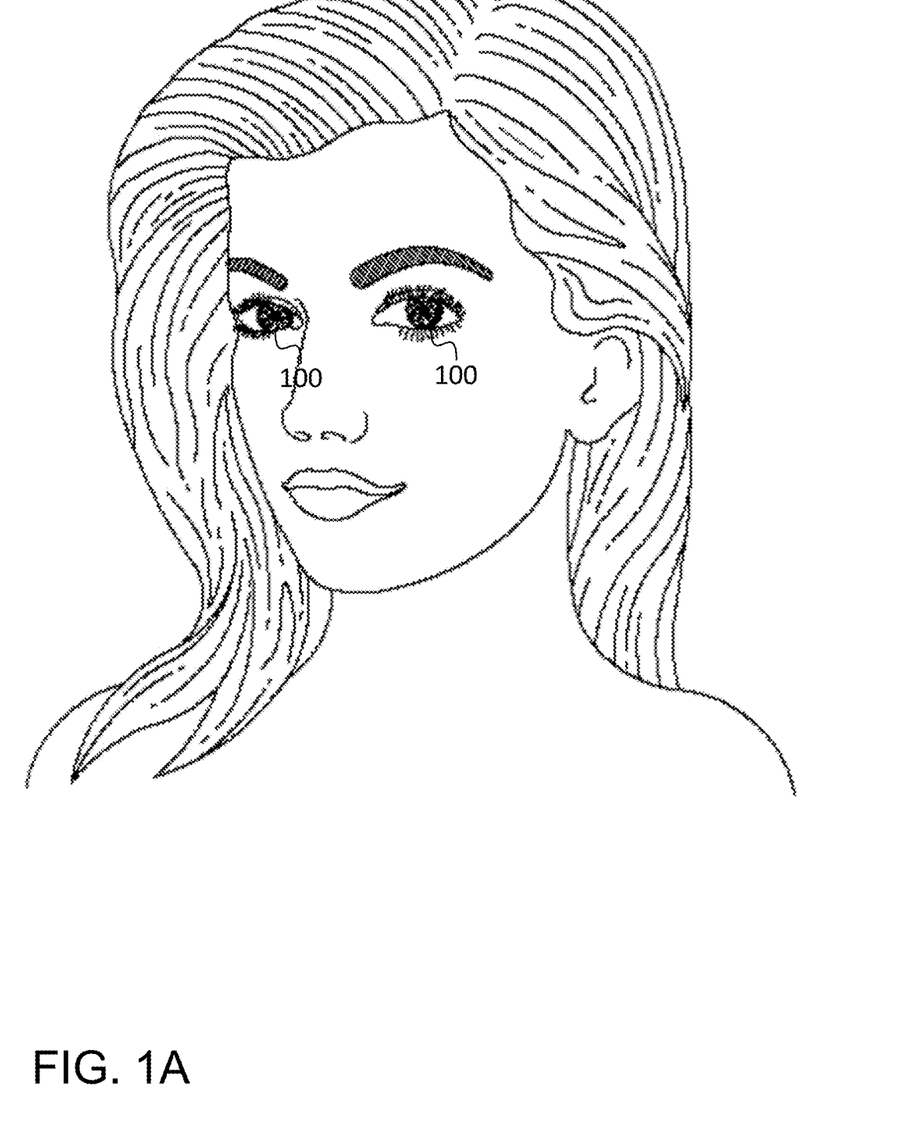
FIG. 1A is an illustration of a wearer wearing electronic contact lenses, according to an embodiment of the present disclosure.

FIG. 1A shows a wearer wearing an electronic contact lens 100. The electronic contact lens 100 may include various electronic components, such as a display, a forward-looking imager, motion sensors (such as a gyroscope 111, an accelerometer 112, and a magnetometer 113, the combination of which may be referred to as an inertial measurement unit (IMU)), a radio (e.g., a 5-GHz radio transceiver), a lens controller, batteries, and a power supply circuit. The electronic contact lens 100 may have various functions; for example, (i) it may project images or text onto the wearer's retina, causing the wearer to see them projected images (e.g., augmented reality video) or text superimposed on the external scene the wearer is viewing (or only the projected images or text, if the wearer's eyes are closed), or (ii) it may assist a wearer with low vision, using the forward-looking imager. The sensors in the electronic contact lens 100 (e.g., the IMU and the forward-looking imager) may be used to track the wearer's eye movements, so that the displayed images and text may appear, to the wearer, to be stationary, as the wearer's eyes move. In some circumstances, it may be advantageous for the wearer to wear two electronic contact lenses 100.

Figure 1B:
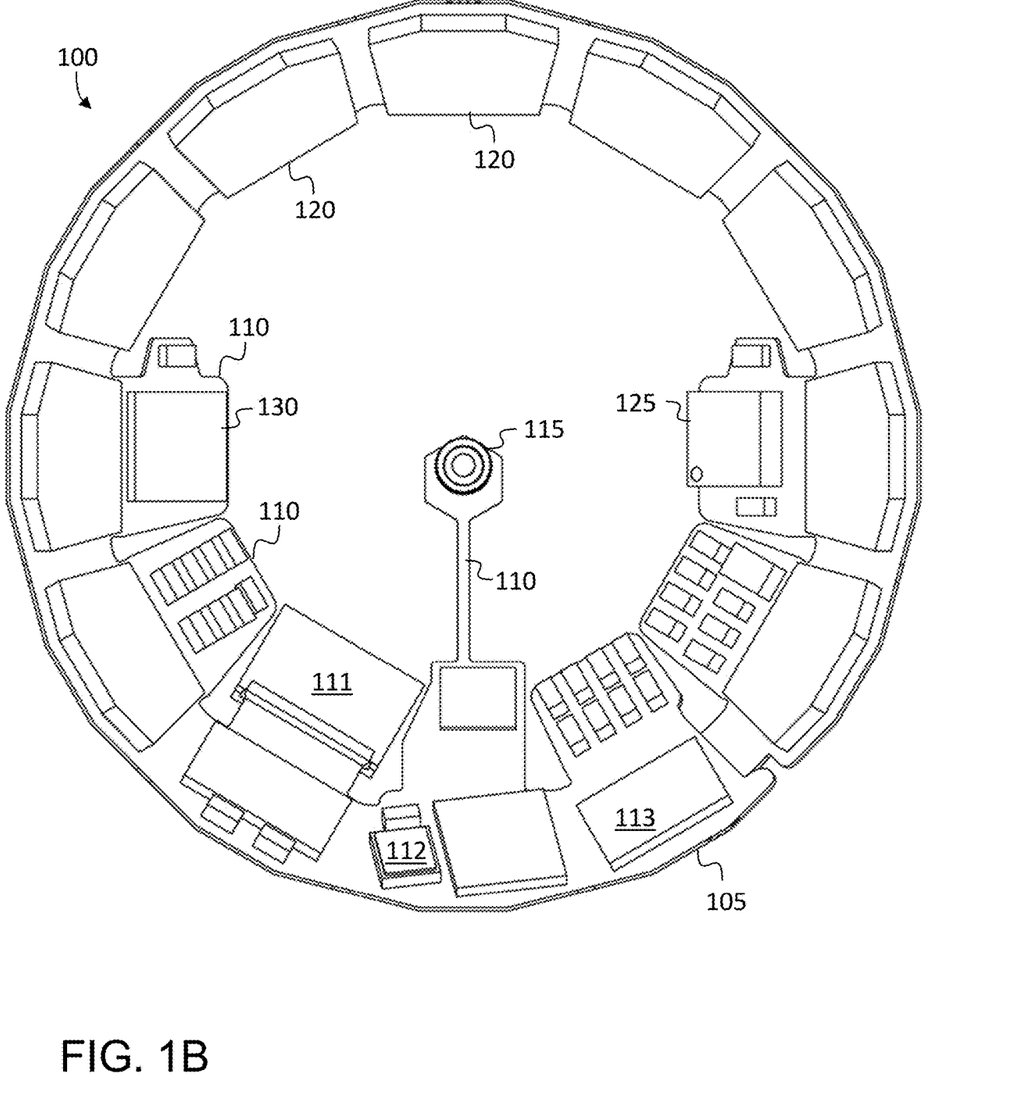
FIG. 1B is a posterior view of a circuit of an electronic contact lens, according to an embodiment of the present disclosure.

FIG. 1B shows a posterior view of a circuit for an electronic contact lens 100, in some embodiments. The circuit is fabricated as a flexible board 105, with a shape approximating a portion of a sphere, which may be included within the volume of a scleral contact lens. The circuit may be fabricated as an initially flat flexible board 105 (e.g., a plurality of components soldered to a flexible printed circuit) which may be coiled into the shape of a truncated cone with a plurality of extensions 110 for additional circuitry and for the display 115 (which may be a small projector (or "femtoprojector") configured to project light onto the wearer's retina). Except for the display 115 and the extension 110 supporting it, the circuit may be entirely outside of the area of the wearer's pupil. As mentioned above, the electronic contact lens 100 may also include, for example, an energy storage device (e.g., one or more batteries 120), a radio (or "transceiver circuit") 125, a lens controller 130, an imager, sensors, and a power supply circuit.

Figure 1C:
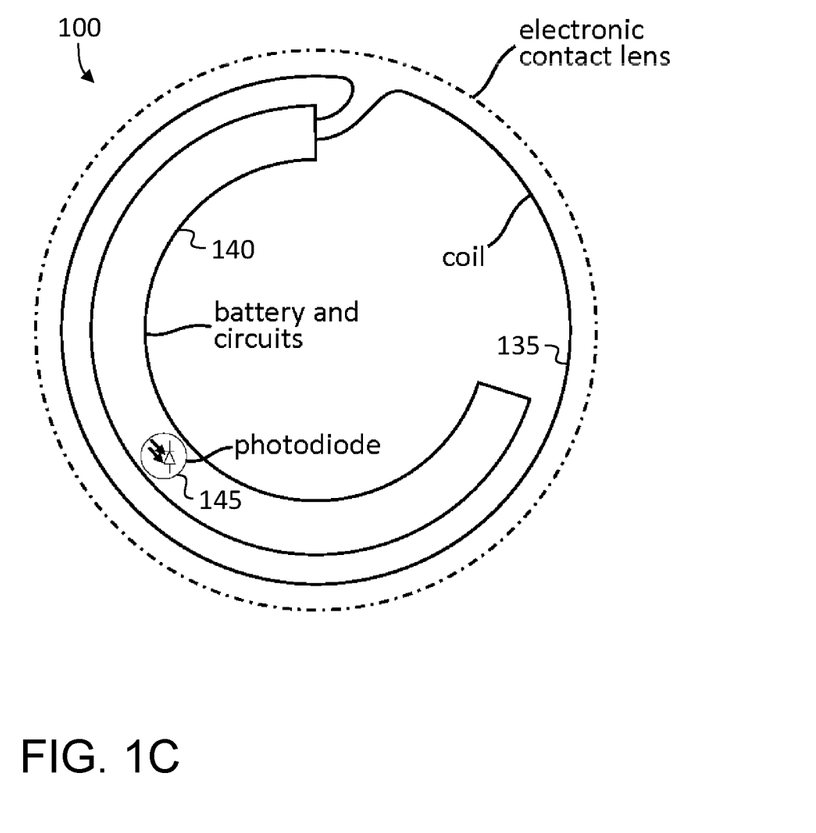
FIG. 1C is a schematic posterior view of an electronic contact lens, according to an embodiment of the present disclosure.

FIG. 1C shows the electronic contact lens 100, and a battery-based power system that, in some embodiments, may power the electronic contact lens 100 (other elements of the electronic contact lens 100, some of which are illustrated in FIG. 1B, are not shown, for clarity). The system includes a coil 135 for receiving power, inductively, from an external power source. Instead of including a plurality of batteries 120, each in a separate package, as illustrated in FIG. 1B, the electronic contact lens 100 may include a single battery module 140, as illustrated in FIG. 1C, which may include an energy storage device, e.g., a battery, for storing energy, a circuit for receiving power from the coil and charging the battery, and a detector (e.g., one or more photodiodes 145) for detecting the presence of a charger (which may include a light source 210 (FIG. 2) for illuminating the photodiodes 145 during charging). The circuit of the battery module 140 may include (i) a first part, referred to as the charging circuit, which performs voltage multiplication, generates a DC current, and provides protection functions as discussed in further detail below, and (ii) a second part, referred to as the battery charging control circuit, which receives the DC current from the charging circuit, and controls the charging current supplied to the battery. In some embodiments the battery or batteries and the associated circuitry may be in separate packages, separately installed on the flexible board 105, as illustrated, for a plurality of batteries, in FIG. 1B.

Figure 1D:
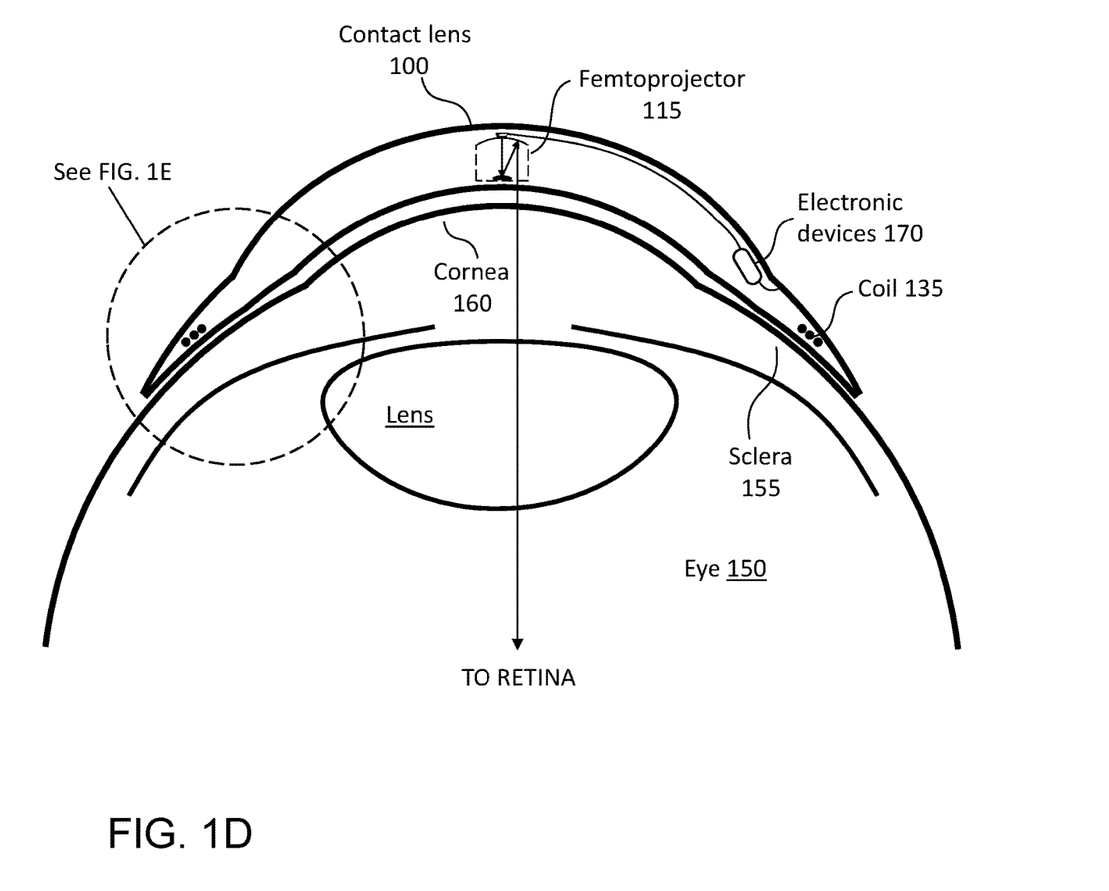
FIG. 1D is a schematic cross-sectional view of an electronic contact lens and an eye, according to an embodiment of the present disclosure.
Figure 1E:
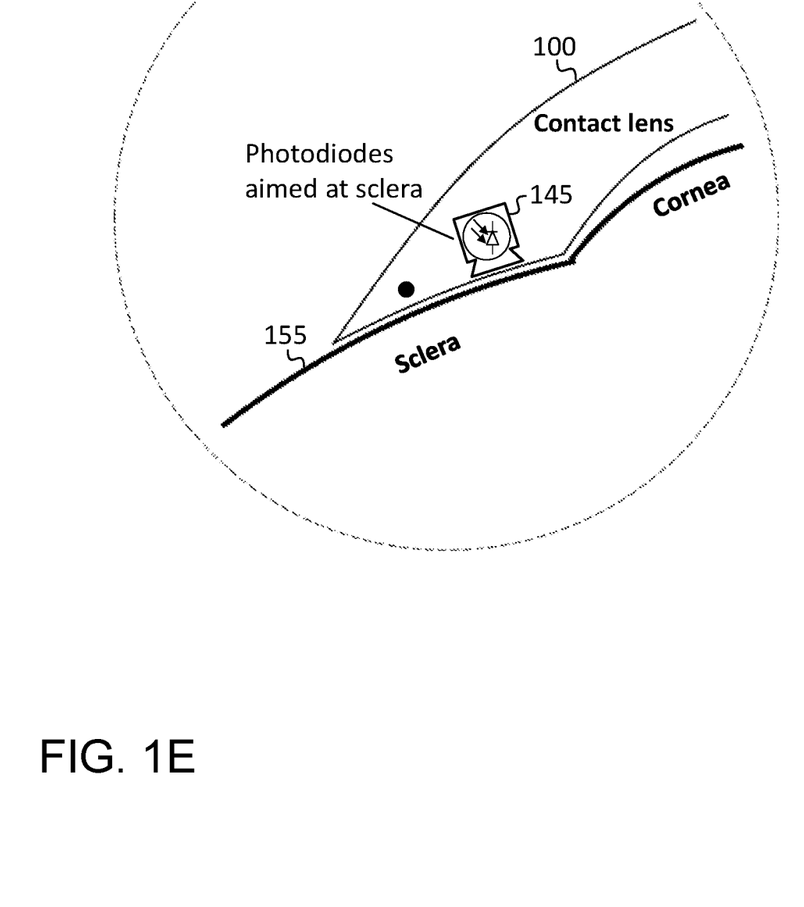
FIG. 1E is an enlarged view of a portion of FIG. 1D.

FIG. 1D shows a cross-sectional view of an electronic contact lens 100 and the eye 150 of a wearer wearing the electronic contact lens 100. The electronic contact lens 100 touches the sclera 155, but vaults over the cornea 160. The electronic contact lens 100 is separated from the cornea 160 by a layer of tear fluid that is about 20-200 microns thick. As mentioned above, the electronic contact lens 100 may include various electronic devices 170, such as the radio 125, the lens controller 130, the imager, the sensors, and the power supply circuit. FIG. 1E is an enlarged view of a portion of FIG. 1D. As shown in FIG. 1E, the one or more photodiodes 145 may be aimed, when the electronic contact lens 100 is worn, at the sclera 155, which may be opaque, so that little light reaches the one or more photodiodes 145 when the electronic contact lens 100 is worn, even if the wearer is in a brightly light environment.

Figure 2:
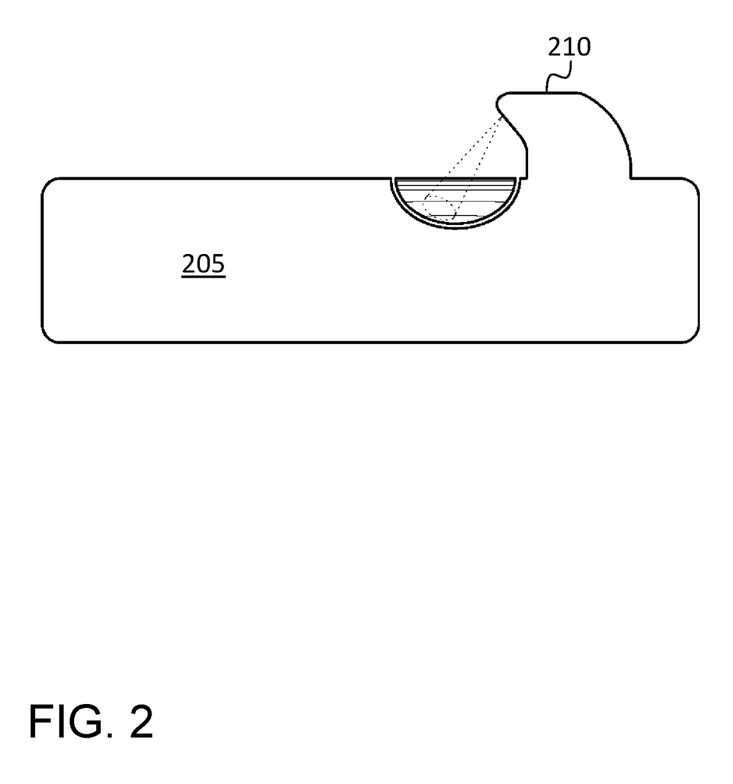
FIG. 2 is a cross-sectional view of a charger for an electronic contact lens, according to an embodiment of the present disclosure.

FIG. 2 shows a charger 205 for an electronic contact lens 100, in some embodiments. During charging, the electronic contact lens 100 is placed in a lens compartment in the charger, and a drive coil in the charger, which is inductively coupled to the coil 135 of the electronic contact lens 100, supplies power, for charging the battery, to the coil 135 of the electronic contact lens 100. The lens compartment may be watertight and configured to hold a cleaning solution, so that the electronic contact lens 100 may be cleaned while being charged. The presence of a fluid (e.g., a cleaning solution) in the charger may also keep the electronic contact lens 100 cool during charging. The charging circuit may include a disabling circuit which may, when the electronic contact lens 100 is being worn, be in a charging-disabled state, and interrupt current paths at one or more points in the charging circuit. As such, the charger may include an enabling system for enabling the charging of the electronic contact lens 100 by putting the disabling circuit in a charging-enabled state.

For example, the enabling system may include a light source 210 that illuminates the posterior surface of the contact lens with light with an irradiance exceeding the greatest irradiance expected to be incident on the scleral posterior surface of the contact lens when the electronic contact lens 100 is being worn (so that the photodiode faces the sclera and is blocked from receiving light). As used herein, the "scleral posterior surface" is the portion of the posterior surface of the electronic contact lens 100 that rests on the sclera of the eye. The light from the light source may be detected by the one or more photodiodes 145, causing the charging circuit to be enabled.

Figure 3:
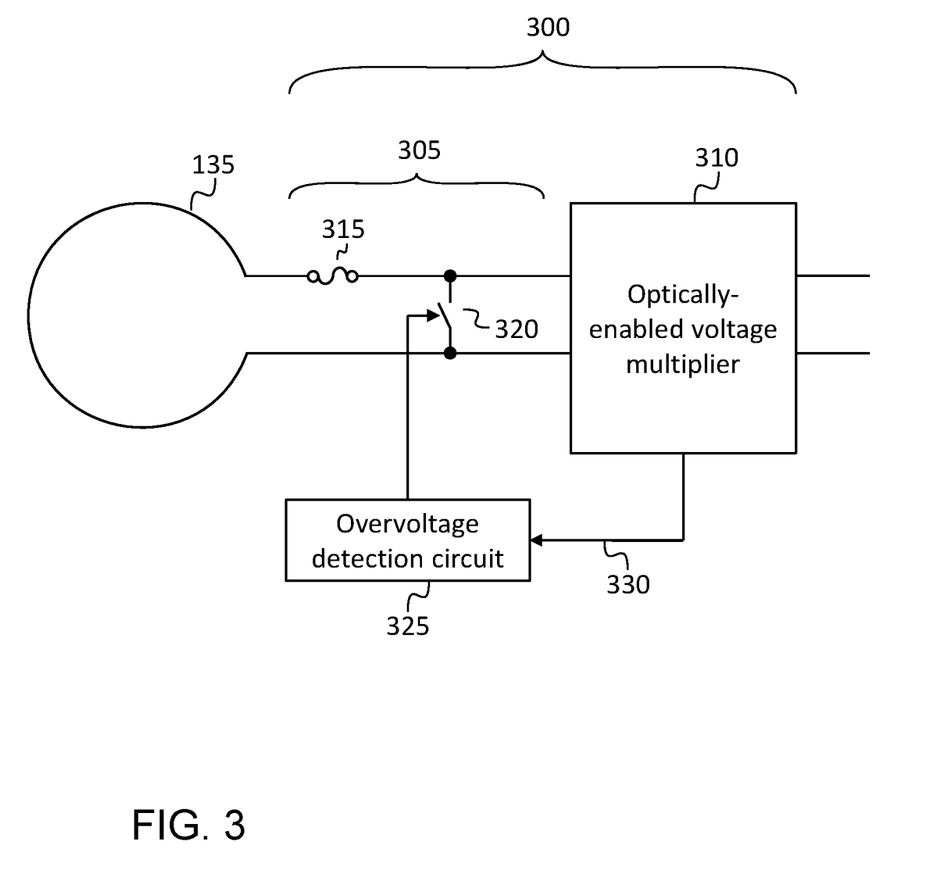
FIG. 3 is a block diagram of a coil and a charging circuit, according to an embodiment of the present disclosure.

FIG. 3 is a block diagram of the coil 135 and the charging circuit 300 of the electronic contact lens 100. The coil is connected, through an overvoltage protection circuit 305, to the AC input of an optically-enabled voltage multiplier 310. The overvoltage protection circuit 305 includes a fuse 315, a shorting switch 320, and an overvoltage detection circuit 325. A voltage sensing connection 330 between the optically-enabled voltage multiplier 310 and the overvoltage detection circuit 325 feeds, to the overvoltage detection circuit 325 a signal (i) used, by the overvoltage detection circuit 325, to assess whether an overvoltage condition has been reached, and (ii) that supplies operating power to the overvoltage detection circuit 325.

When an overvoltage condition is reached, it is detected by the overvoltage detection circuit 325, which turns on (i.e., closes) the shorting switch 320. The turning on of the shorting switch reduces the voltage applied to the optically-enabled voltage multiplier 310 (thereby protecting the components of the optically-enabled voltage multiplier 310 from a potentially harmful voltage) and allows a large current to flow through the fuse 315, which may cause the fuse to blow, interrupting the connection between the coil 135 and the circuitry of the electronic contact lens 100. The shorting switch 320 may have a current-handling capability greater than that of the fuse 315, so that, e.g., a short-duration overvoltage condition having too little energy to blow the fuse 315 may also leave the shorting switch 320 undamaged.

The shorting switch 320 may be a suitable semiconductor switch. In some embodiments, the shorting switch 320 is a metal oxide semiconductor field effect transistor (MOSFET) having a gate terminal, a source terminal, a drain terminal, and a bulk terminal (or a "body" terminal), the bulk terminal being connected neither to the source terminal nor to the drain terminal, so that, when turned on, the shorting switch 320 may conduct current in both directions. The optically-enabled voltage multiplier 310 may include an energy-storage capacitor 405 (FIG. 4) (connected to the voltage sensing connection 330) that (i) may be charged up as the voltage on the voltage sensing connection 330 increases, and that (ii) may continue to power the overvoltage detection circuit 325 for some period of time (e.g., for between 10 ms and 1000 ms) after an overvoltage condition is reached and the turning on of the shorting switch 320 prevents the overvoltage detection circuit 325 from receiving further power through the voltage sensing connection 330. Moreover, a capacitor may be connected to the gate of the shorting switch 320, so that it will remain turned on for some time even if a transistor that initially drives the gate (and the capacitor) to turn on the shorting switch 320 is later turned off.

Figure 4:
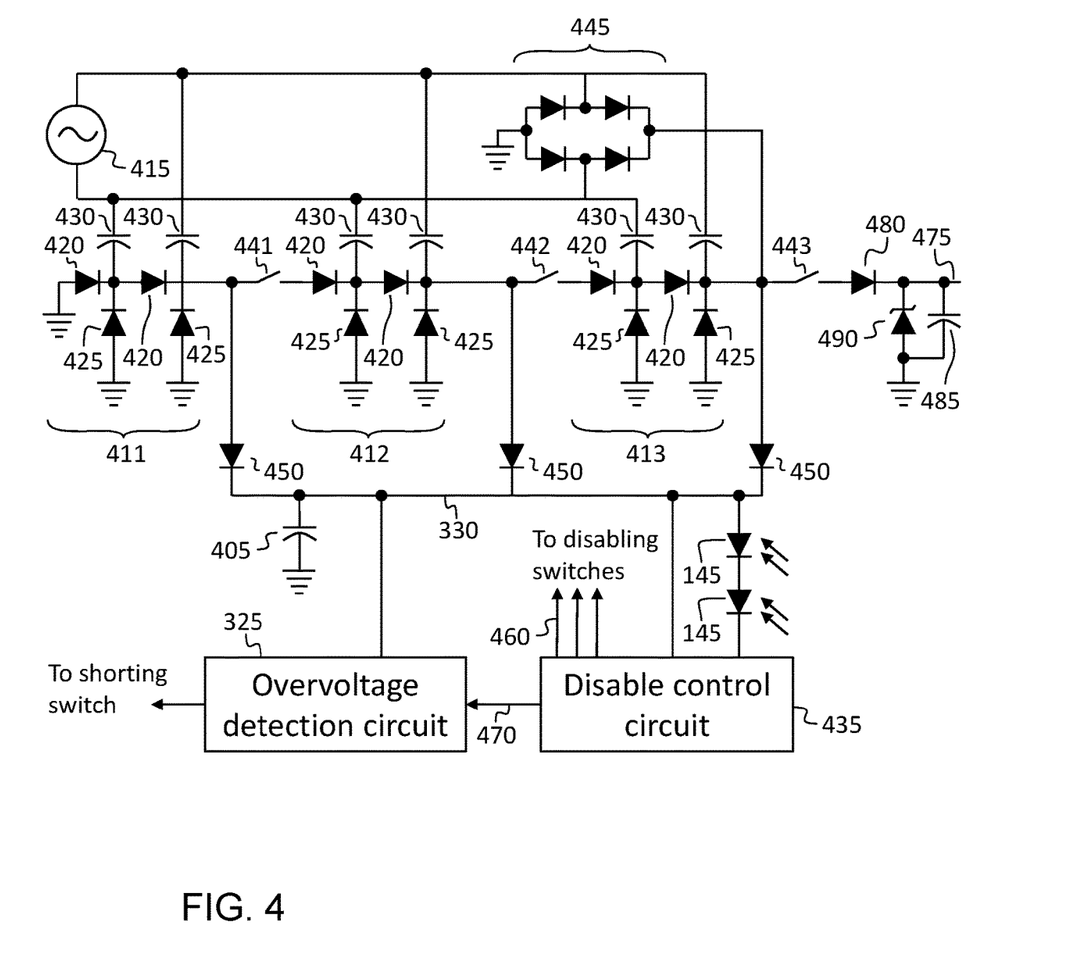
FIG. 4 is a schematic diagram of a portion of a charging circuit, according to an embodiment of the present disclosure.

In the overvoltage detection circuit 325, the voltage sensing connection 330 may be connected to the anode of a first diode of a chain of N diodes (e.g., 9 diodes) connected in series, the cathode of each diode in the chain except the last being connected to the anode of the next diode of the series. The cathode of the last diode may be connected to ground, and the anode of the last diode may be connected to the gate of a first MOSFET which is part of an amplifier and latch circuit, in the overvoltage detection circuit 325, that is configured to turn on the shorting switch 320 when the first MOSFET is turned on. As such, the chain of diodes forms a voltage divider (diodes may be employed instead of, e.g., resistors, because diodes may consume less power and occupy less chip area). When the turning on of the shorting switch 320 causes the optically-enabled voltage multiplier 310 to stop driving the voltage sensing connection 330, the voltage on the voltage sensing connection 330 may begin to fall, causing the first MOSFET to turn off relatively quickly. The amplifier and latch circuit may therefore include a latch to then keep the shorting switch 320 turned on as long as the voltage on the voltage sensing connection 330 is sufficient to power the amplifier and latch circuit. As such, when the voltage on the gate of the first MOSFET is sufficient to turn on the first MOSFET, the shorting switch is turned on until the energy stored in the energy-storage capacitor 405 is substantially depleted.

The voltage divider may have a high-pass characteristic (due in part, for example, to signal coupling through the Miller capacitance of the first MOSFET), and the overvoltage detection circuit 325 may therefore trigger at a lower voltage when the voltage is increasing rapidly than when the voltage is increasing slowly. This behavior may be advantageous; to the extent, however, that the circuit is excessively sensitive to the rate of change of the voltage, a capacitor may be added in parallel with the last diode.

The optically-enabled voltage multiplier 310 is illustrated, in some embodiments, along with the overvoltage detection circuit 325, in FIG. 4. The input to the optically-enabled voltage multiplier 310 is the output of the combination of the coil 135 and the overvoltage protection circuit 305, which, when the shorting switch 320 is open, operates as (and, in FIG. 4, is represented schematically as) an AC power source 415. The optically-enabled voltage multiplier may include a plurality of rectifying stages, e.g., a first rectifying stage 411, a second rectifying stage 412, and a third rectifying stage 413. Each rectifying stage may include two series diodes 420 (connected in series, with the cathode of a first series diode 420 being connected to the anode of a second series diode 420), two shunt diodes 425 connected to ground, and two capacitors 430, coupling the rectifying stage to the AC power source 415. As such, the terminals of the capacitors 430 connected to the AC power source 415 form AC input terminals of the rectifying stage, the anode of the first series diode 420 forms a DC input of the rectifying stage, and the cathode of the second series diode 420 forms a DC output of the rectifying stage. The anode of the first series diode 420

(i.e., the DC input) of each of the rectifying stages is connected to the output of the preceding rectifying stage (i.e., to the cathode of the second series diode 420 of the preceding rectifying stage), except for the anode of the first series diode 420 of the first rectifying stage 411, which is connected to ground. The optically-enabled voltage multiplier 310 may be part of an integrated circuit fabricated using a complementary metal oxide semiconductor (CMOS) fabrication process. Each of the shunt diodes 425 may be formed (along with a respective one of the series diodes 420) as part of this fabrication process; the shunt diodes may not be necessary for the operation of the optically-enabled voltage multiplier 310.

As mentioned above, a disabling circuit within the optically-enabled voltage multiplier 310 may cause the charging circuit 300 to be enabled when illuminated (in the charger) and to be disabled when the electronic contact lens 100 is worn. The disabling circuit may include (i) the disable control circuit 435, and (ii) a first disabling switch 441, a second disabling switch 442, and a third disabling switch 443, which may be connected in series with the output of the first rectifying stage 411, the output of the second rectifying stage 412, and the output of the third rectifying stage 413, respectively, as shown. As such, each enabling switch may, when open, interrupt the current path through the series diodes to the output 475 of the optically-enabled voltage multiplier 310 (and of the charging circuit 300). Each of the disabling switches 441, 442, 443 may be a MOSFET; in some embodiments the first disabling switch 441 is an n-channel MOSFET, and each of the second disabling switch 442 and the third disabling switch 443 is a p-channel MOSFET. In some embodiments, the disabling switches 441, 442, 443 are all controlled by latches that are kept in their respective states as long as the coil voltage is applied (i.e., as long as the voltage on the voltage sensing connection 330 is sufficient to maintain the states of the latches). The absence of light on the photodiodes ensures that these latches will always come up in the blocking state (i.e., in the state that causes the corresponding disabling switch to be open) when any voltage is developed across the input terminals. The presence of light on the photodiodes ensures that these latches will always come up in the non-blocking state (i.e., in the state that causes the corresponding disabling switch to be closed) when any voltage is developed across the input terminals.

A full-wave rectifier 445 may be connected across the AC power source 415; its DC output may be connected to the output of the third rectifying stage 413. In operation, the AC output of the AC power source 415 is capacitively coupled across the series diodes 420, so that each of the rectifying stages 411, 412, 413 operates as a DC source, the three DC sources being connected in series when the disabling switches 441, 442, 443 are closed (in the enabled state). As a result, the voltage at the output of the third rectifying stage 413 may be the larger of (i) the voltage generated by the full-wave rectifier 445 and (ii) the sum of the respective DC voltages generated by the rectifying stages 411, 412, 413.

One or more sense diodes 450 (e.g., three sense diodes 450) may each have an anode connected to an output of a respective one of the rectifying stages 411, 412, 413, and a cathode connected to the voltage sensing connection 330, so that, in operation, the voltage on the voltage sensing connection 330 corresponds to (e.g., is a diode drop less than) the greatest of the output voltages of the rectifying stages 411, 412, 413. The disabling switches 441, 442, 443 may be controlled by the disable control circuit 435, which may have a plurality of outputs 460 each connected to a respective one of the disabling switches 441, 442, 443.

One or more photodiodes 145 (e.g., two photodiodes 145 connected in series) may detect light from an external light source (e.g., the light source 210 of the charger 205, which may produce an irradiance of about 10 mW/cm$^2$ at the photodiodes 145) and, when such light is detected, cause the optically-enabled voltage multiplier 310 to become enabled. For example, the photodiodes 145 may be connected to the gate of an n-channel MOSFET having a source connected to ground and a drain connected to the gates of the second disabling switch 442 and the third disabling switch 443 (through the outputs 460), so that when the photodiodes 145 are illuminated, the n-channel MOSFET is turned on, pulling down the gates of (and turning on) the second disabling switch 442 and the third disabling switch 443. The n-channel MOSFET may also turn on another p-channel MOSFET, in the disable control circuit 435, which in turn pulls up (to the voltage of the voltage sensing connection 330) the gate of the first disabling switch 441, turning it on. Two (or more) series-connected photodiodes 145 may be used, so that the voltage generated when they are illuminated is sufficient to turn on the MOSFET to which they are connected. A transistor (e.g., a MOSFET) configured as a high resistance pull-down resistor, within the disable control circuit 435, may compensate for leakage current through the photodiodes. This transistor may be temperature sensitive, and as the photodiodes change temperature during operation, and their leakage current varies, the transistor may vary similarly so that the leakage current does not cause the charging circuit to be enabled. A window (e.g., a photolithographically formed hole in an opaque layer, e.g., in a layer of metal, covering the integrated circuit that contains the optically-enabled voltage multiplier 310) may allow light from the light source 210 to reach the photodiodes 145. The portion of the electronic contact lens 100 between the window and the scleral posterior surface of the electronic contact lens 100 may be transparent, allowing light to reach the window from the light source 210 of the charger 205.

The output 475 of the optically-enabled voltage multiplier 310 may be connected to a load, e.g., to the battery charging control circuit. An output diode 480 may prevent current from flowing back into the optically-enabled voltage multiplier 310 from the load, and an output capacitor 485 may help to suppress ripple.

If the electronic contact lens 100 is exposed to an oscillating magnetic field while being worn, the combination of the overvoltage protection circuit 305 and the optically-enabled voltage multiplier 310 may avoid (i) damage to active elements of the electronic contact lens 100 by high voltages or currents and (ii) charging when the contact lens is worn. For example, when the contact lens is worn little light is incident on the photodiodes 145, and the disabling switches 441, 442, 443 are open. If a relatively small oscillating magnetic field is present, the full-wave rectifier 445 and the rectifying stages 411, 412, 413 may each generate a relatively small voltage, which will appear (less a diode drop) on the voltage sensing connection 330, and which will charge the energy-storage capacitor 405 of the overvoltage detection circuit 325. In this situation, current may be prevented from flowing to the load of the optically-enabled voltage multiplier 310 by the (open) third disabling switch 443. If the oscillating magnetic field generates a sufficiently high voltage in any one of the rectifying stages 411, 412, 413 to trigger the overvoltage detection circuit 325, the shorting switch 320 may be turned on, and a sufficiently high current may flow through the fuse and the shorting switch to cause the fuse to blow.

The use of three disabling switches 441, 442, 443 (instead of, e.g., only a single disabling switch at the output of the optically-enabled voltage multiplier 310) may avoid a circumstance in which the voltage across a disabling switch is sufficiently great to damage the disabling switch without triggering the overvoltage detection circuit 325. For example, in an embodiment in which only the third disabling switch 443 is present, it may be possible for the voltage on the drain connection to rise due to the voltage multiplier being essentially unloaded. In that circumstance, the dielectric breakdown strength of the transistor may be exceeded, which may lead to either immediate failure or gradual weakening that may cause an eventual failure.

The optically-enabled voltage multiplier 310 may be configured to operate with an input RMS AC voltage of about 1.5 V, and it may generate, when the electronic contact lens 100 is being charged, about 5 V at the output 475. The output voltage may be limited by a chain of (e.g., by a chain of seven) forward-biased diodes (illustrated in FIG. 4 as a single, reverse-biased, Zener diode 490). In some embodiments, the disable control circuit 435 has an overvoltage control disabling output 470, which when active (e.g., when the photodiodes are illuminated) disables the overvoltage detection circuit 325 (e.g., by turning on a transistor connected across the last diode of the chain of diodes forming the voltage divider of the overvoltage detection circuit 325), allowing higher voltages to be present when the electronic contact lens 100 is in the charger 205. In some embodiments, more or fewer rectifying stages may be employed instead of the three rectifying stages 411, 412, 413 illustrated in FIG. 4. For example, an optically-enabled voltage multiplier 310 with only two rectifying stages may draw a lower current (through the fuse) during charging, making possible (i) the use of a fuse with a lower current capacity, and therefore (because the shorting switch 320 may be designed to be capable of carrying sufficient current to cause the fuse to blow) (ii) the use of a smaller transistor as the shorting switch 320.

In some embodiments the overvoltage detection circuit 325 and the optically-enabled voltage multiplier 310 are entirely powered by (i) power received through the coil 135 and (ii) power received through the photodiodes 145, so that the operation of these circuits does not rely on power from the battery or batteries, and these circuits will operate as designed if the battery or batteries are completely discharged. Each of the overvoltage detection circuit 325 and the disable control circuit 435 may be designed to dissipate little power. For example, the disable control circuit 435 may be designed such that in both the enabled state and in the disabled state, each current path from the voltage sensing connection 330 to ground is blocked, e.g., by a transistor that is turned off, by a reverse-biased diode, or the like, so that in each state of the disable control circuit 435 the steady-state current flow is very small.

Examples discussed herein include circuits using field effect transistors (e.g., MOSFETs); in some embodiments, however, other amplifying or switching elements, e.g., bipolar junction transistors, may be used in addition or instead of field effect transistors. As used herein, the word "or" is inclusive, so that, for example, "A or B" means any one of (i) A, (ii) B, and (iii) A and B. As used herein, when a first element is referred to as being "directly connected" or "directly coupled" to a second element, there are no intervening elements present. As used herein, when a first element is referred to as being "generally connected" to a second element, it means that the first element and the second element are connected by an electrical path that may contain arbitrary intervening elements (e.g., intervening elements connected between the first element and the second element), including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit. When a first element is referred to as being "operatively coupled" to a second element, it means that (i) in operation, the first element receives a signal from the second element (possibly through intervening elements, (which may or may not qualitatively modify the signal) or (ii) in operation, the second element receives a signal from the first element (possibly through intervening elements, which may or may not qualitatively modify the signal).

Although exemplary embodiments of a charging circuit for an electronic contact lens have been specifically described and illustrated herein, many modifications and variations will be apparent to those skilled in the art. Accordingly, it is to be understood that a charging circuit for an electronic contact lens constructed according to principles of this disclosure may be embodied other than as specifically described herein. The invention is also defined in the following claims, and equivalents thereof.

What is claimed is:

1. A contact lens charging system, comprising:
    two contact lenses and a contact lens charger, each contact lens comprising:
        a display comprising a femtoprojector configured to project light onto a wearer's retina;
        a gyroscope, an accelerometer, a magnetometer, a radio transceiver, and a forward-looking imager;
        a plurality of batteries, each in a separate package, mounted on a flexible board which is coiled into a shape of a truncated cone with a plurality of extensions for the gyroscope, accelerometer, magnetometer, radio transceiver, forward-looking imager and display, the batteries placed outside the area of a wearer's pupil;
        a charging circuit, the charging circuit comprising a disabling circuit for disabling the charging circuit while the contact lens is being worn,
            wherein the disabling circuit is configured to enable the charging circuit while the posterior surface of the contact lens is being illuminated by the contact lens charger with an irradiance of 10 mW/cm$^2$, the irradiance being greater than a maximum irradiance incident on a scleral posterior surface of the contact lens while the contact lens is being worn,
            wherein the disabling circuit comprises a first photodiode connected to a switch, the first photodiode configured to be illuminated through a window in an opaque layer of the disabling circuit, the first photodiode configured to be illuminated through a transparent portion of the contact lens, the first photodiode aimed at the sclera of the eye of the wearer while the contact lens is being worn,
            wherein the disabling circuit comprises a second photodiode connected in series with the first photodiode,
            wherein the disabling circuit comprises a first switch configured to interrupt a current path to an output of the charging circuit;

an energy storage device, comprising the plurality of batteries, the storage device connected to the charging circuit;

a coil, connected to an input of the charging circuit, for receiving electrical power inductively, wherein the charging circuit comprises an optically-enabled voltage multiplier connected to the coil, the voltage multiplier comprising an energy-storage capacitor that powers an overvoltage detection circuit for at least 1,000 milliseconds after an overvoltage condition is reached;

wherein the voltage multiplier has a first AC input terminal and a second AC input terminal and an overvoltage protection circuit comprising:
  an overvoltage detection circuit,
  a fuse, and
  a shorting switch;
a first terminal of the coil is connected to the first AC input terminal through the fuse;
a second terminal of the coil is connected to the second AC input terminal; and
the shorting switch is connected across the first AC input terminal and the second AC input terminal;

wherein the voltage multiplier comprises a first rectifying stage and a second rectifying stage, and the first switch is connected between a DC output of the first rectifying stage and a DC input of the second rectifying stage;

wherein three disabling switches are connected to an output of the optically-enabled voltage multiplier;

wherein the optically-enabled voltage multiplier is configured to operate with an input RMS AC voltage of 1.5V and to generate, while an electronic contact lens is being charged, 5V at an output of the voltage multiplier, the 5V at the output of the voltage multiplier limited by a chain of seven forward-biased diodes;

wherein the charging circuit comprises a full-wave rectifier, connected to the coil and operatively coupled to the output of the charging circuit;

wherein the overvoltage detection circuit comprises a chain of nine diodes connected in a series, each diode in the chain, except a last diode, being connected to an anode of a next diode in the series, the chain of diodes forming a voltage divider having a high pass characteristic such that the overvoltage detection circuit triggers at a first voltage when the voltage increases rapidly and a second voltage when the voltage increases slowly, the first voltage being lower than the second voltage, a capacitor connected in parallel with the last diode; and, the contact lens charger comprising:
  a lens compartment, wherein the lens compartment is watertight and holds a fluid cleaning solution, the cleaning solution cleans the contact lens and keeps it cool during charging, and the charger includes an enabling system which enables charging of the contact lens by putting the disabling circuit in a charging-enabled state;
  a light source that illuminates the posterior surface of the contact lens with light with an irradiance of 10 mW/cm$^2$ at the photodiodes which exceeds the greatest irradiance expected to be incident on the scleral posterior surface of the contact lens while the electronic contact lens is being worn; and,
  a charger drive coil in the charger which is inductively coupled to the coil of the contact lens.

\* \* \* \* \*